LOW LEVEL SEMICONDUCTOR SWITCH HAVING A VOLTAGE REGULATING ZENER DIODE IN A FEEDBACK PATH
Filed Oct. 25, 1960
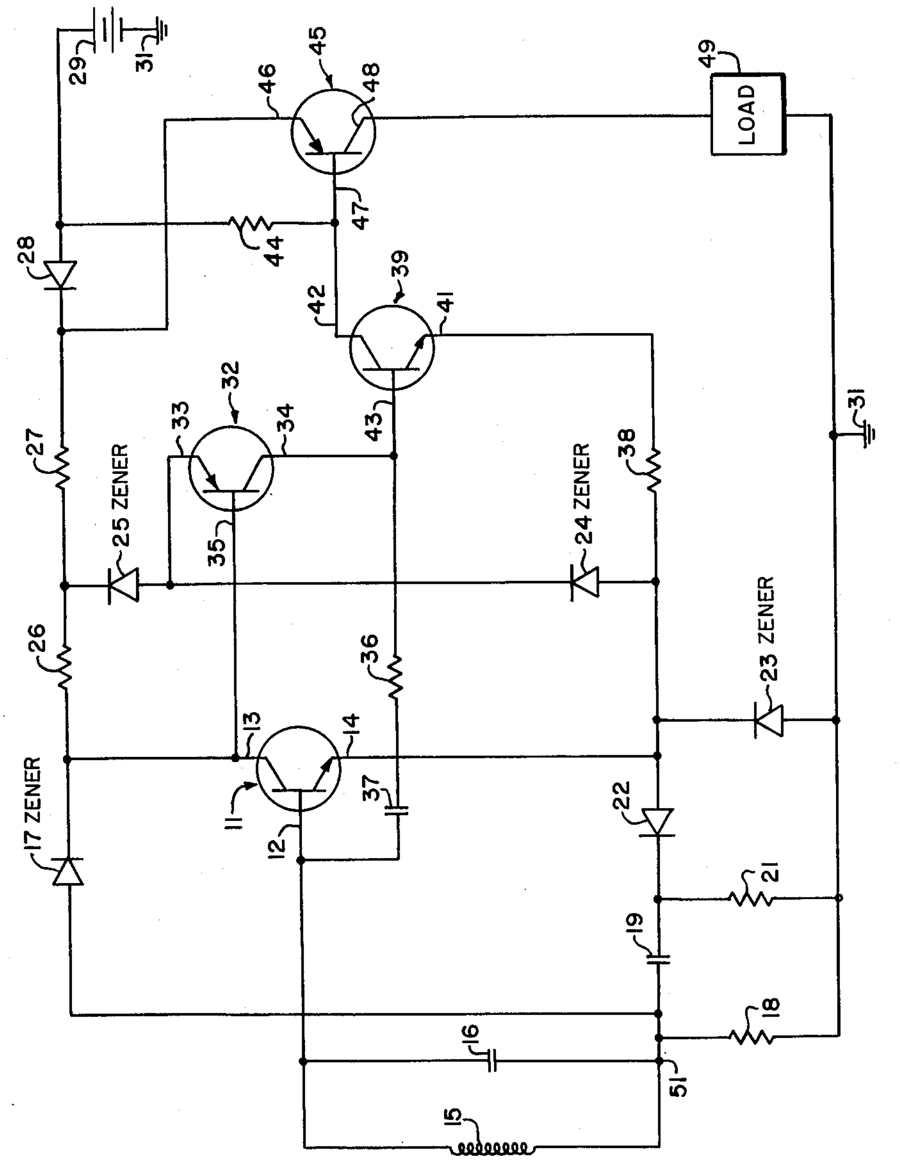
INVENTOR.
W. R. LITTLE
BY W. E. Duesenberry
O. L. Hodges
ATTYS 3,095,512

LOW LEVEL SEMICONDUCTOR SWITCH HAVING A VOLTAGE REGULATING ZENER DIODE IN A FEEDBACK PATH

William R. Little, Seattle, Wash., assignor, by mesne assignments, to the United States of America as represented by the Secretary of the Navy Filed Oct. 25, 1960, Ser. No. 64,969
11 Claims. (Cl. 307—88.5)

This invention relates to circuits for producing an impulse in response to low level signals and more particularly to circuits which are designed to actuate a load in response to such signals.

In prior low level actuating circuits great difficulty was encountered because of the great sensitivity associated with the input stage which resulted in the necessity of hand picking the amplifying elements so as to achieve satisfactory operation. Also, changes in temperature resulted in variations of parameters that frequently caused malfunction of the apparatus.

It has been realized that low level actuation can be achieved by relying on the rate of change of a voltage rather than strictly on the amplitude of the applied signal.

Accordingly; it is an object of this invention to provide a new and improved circuit responsive to small amplitude signals having a rate of change exceeding predetermined values, which will actuate a suitable load.

It is a further object of this invention to provide an actuating circuit responsive to signals in excess of two cycles per second and having amplitudes which may be as low as ten millivolts.

An additional object of this invention is to provide a low amplitude actuating circuit that is operative over a wide range of temperatures.

A still further object of this invention is to provide a low level, relatively high frequency actuating circuit that is light, compact, which requires very little power, is highly reliable, simple, and easily manufactured.

Various other objects and advantages will appear from the following description of one embodiment of the invention, and the novel features will be particularly pointed out hereinafter in connection with the appended claims.

It is contemplated that the foregoing objects will be accomplished by using a transistor having its base coupled to a signal source. The emitter of the transistor is coupled to the signal source by means of a capacitor and the collector is coupled to the transistor base and to the signal source by way of the Zener diode.

The accompanying FIGURE is a schematic diagram of one form of the electronic circuit designed to carry out the invention.

Referring now specifically to the figure, there is disclosed a three-terminal amplifying element, NPN type transistor 11 having base electrode 12, emitter electrode 14 and collector electrode 13. The base electrode may be considered as an input terminal while the collector and emitter electrodes may both be considered as output terminals.

Base terminal 12 of transistor 11 is connected to the parallel combination of detector coil 15 and shaping capacitor 16 which supply signals to terminal 12 commensurate with changes in the magnetic field of the environment in which the coil is located. The change in magnetic field produces a voltage having one polarity applied to the base terminal 12 and an opposite polarity applied to terminal 51.

Zener diode 17 normally provides 100% feedback between collector 13 and base 12 of transistor 11 by means of the connections of its anode to terminal 51 and its cathode to collector 13. This Zener diode should be of the silicon type so that it maintains its rated Zener voltage with only a few microamperes Zener current flowing therethrough from cathode to anode.

Stabilizing resistor 18 is connected between terminal 51 and ground terminal 31 while charging capacitor 19 which has a relatively large value is connected to terminal 51 and to one side of biasing resistor 21, the other side of which is grounded. The junction between resistor 21 and capacitor 19 is connected to the cathode of diode 22 which prevents heavy current flows through transistor 11 due to transient effects when the circuit is initially turned on. The anode of diode 22 is connected to emitter 14 of transistor 11 and to the cathode of Zener diode 23 which regulates the current in Zener diode 17. The anode of Zener diode 23 is connected directly to the ground terminal 31.

The collector electrode 13 is connected to the positive terminal of power supply 29 by way of collector load resistor 26, current limiting resistor 27 and diode 28. The collector of transistor 11 is also connected to the base 35 of transistor 32.

Emitter terminal 33 of switching transistor 32 is connected to the anode of voltage regulator Zener diode 25 while the cathode thereof is connected betwen resistors 26 and 27. Collector 34 of PNP type transistor 32 is connected to the base 12 of transistor 11 by way of the series connected network comprising resistor 36 and condensor 37, thus forming a positive feedback network to transistor 11. The cathode of voltage regulator Zener diode 24 is connected to the emitter terminal 33 while the anode thereof is connected to emitter 14 of transistor 11.

The collector 42 of NPN transistor 39 is connected to the positive terminal of battery 29 by way of load resistor 44 while the emitter terminal 41 is connected to the emitter terminal 14 of transistor 11 by way of load resistor 38. The base 43 is directly connected to collector 34 of transistor 32.

The emitter 46 of amplifying transistor 45 is connected to the cathode of diode 28 which serves to provide a reverse bias or cutoff voltage to transistor 45. Base 47 is connected to resistor 44 which normally maintains transistor 45 in a non-conducting or cutoff state. Collector 48 is connected to one terminal of any suitable load mechanism, which take the form of an explosive primer. The other terminal of load 49 is directly connected to ground.

Under quiescent conditions the transistors 32, 39 and 45 are maintained in a cutoff or non-conducting state. P-N-P type transistor 32 is maintained beyond cutoff because its base voltage is maintained at a sufficiently high potential above the emitter potential due to the voltage regulation provided by Zener diodes, 24, 25 and 17. Silicon transistor 39 remains in a non-conducting or cutoff state under normal quiescent conditions because no current is provided to base 43 by transistor 32.

When the circuit is in the quiescent conditions, transistor 11 will draw relatively little current from supply 29. The Zener diode 17 gives 100% negative feedback to the base 12 of the collector voltage by way of current fed back to the base through detector coil 15. Thus, transistor base current is automatically adjusted so as to maintain constant collector voltage and consequently constant collector current regardless of variations in transistor parameters due to temperature or other effects, such as changes in the voltage of power supply 29. The voltage gain of transistor 11 will be maintained substantially at unity value as long as signals detected by coil 15 have a rate of change or slope less than that associated with the charging circuit of capacitor 19.

When the positive signal applied to base 12 exceeds the slope of the charging circuit associated with capacitor 19, the current in base 12 flowing to emitter 14 through capacitor 19 will increase because the capacitor 19 appears to be a short circuit to such signals. With the increase in base current, additional collector current flows through transistor 11 with a consequent decrease in voltage across Zener diode 17 due to the increased voltage drop across resistor 26. When the voltage across Zener diode 17 decreases, it will no longer appear as a low impedance element and additional collector current flows in transistor 11. Consequently, a current impulse results in transistor 11 when the signal applied to base 12 exceeds a predetermined rate of change and an associated voltage impulse appears at the collector of transistor 11. If it is desirable to vary the rate of change which the circuit will be responsive to, the value of capacitors 16 or 19 or resistor 18 may be changed.

When transistor 11 begins to conduct at a substantially greater rate than it previously conducted in response to the applied input signal, the gain of that transistor will be raised considerably since Zener diode 17 is no longer acting as a negative feedback element between the collector and base. Thus, Zener diode 17 is a means for maintaining the transistor gain at a low level when the current through the Zener diode exceeds a predetermined amount.

It has been found that the resistor 18 and the diode 22 and resistor 21 are not necessary for correct circuit operation for temperature ranges below 35° C., that is, in the room temperature area. Since the amount of current flowing through capacitor 19 determines whether or not Zener diode 17 will conduct, it is seen that capacitor 19 is a means for terminating substantial current flow through the Zener diode when a signal applied to the base of transistor 11 exceeds a predetermined rate of change.

When the current through collector electrode 13 begins to increase, a negative impulse is applied to the base 35 of transistor 32 thereby rendering that transistor in a conductive state. Current then flows from battery 29 through emitter 33 and collector 34 of transistor 32 to the bases 43 and 12 of transistors 39 and 11, respectively. The positive current fed back to base 12 from collector 34 maintains transistor 11 in a heavily conducting state even after the input voltage applied thereto has subsided. Thus, a positive feedback path is established for transistor 11 and it will be kept in a regenerative state. The positive feedback path also includes the circuitry associated with transistor 39. When the current flow from collector 34 through base 43 to emitter 41 of transistor 39 occurs, the voltage across resistor 38 increases. This increased voltage is reflected back to the base 43 and through resistor 36 and capacitor 37 to the base 12 of transistor 11.

The positive current fed to the base 43 of transistor 39 results in a current flow through resistor 44 from battery 29 which produces a negative voltage impulse on the base 47 of transistor 45. This negative impulse renders transistor 45 conductive permitting collector current to flow, thus resulting in actuation of load 49.

It should now be apparent that there has been herein disclosed a new and improved circuit responsive to the rate of change or slope of input signals which is designed to actuate a suitable mechanism. The load will not be actuated by a high amplitude signal if it does not have the required high frequency characteristics but it will be energized by a low level signal having the necessary rate of change.

It will be understood that various changes in the details, materials and arrangement of parts which have been herein disclosed and illustrated in order to explain the nature of the invention, may be made by those skilled in the art within the principle and scope of the invention as expressed in the appended claims.

What is claimed as new and desired to be secured by Letters Patent of the United States is:

1. An impulse producing circuit responsive to signals exceeding a predetermined rate of change comprising a first transistor, means for coupling one polarity of an input signal to the base of said transistor, a Zener diode having one terminal connected to the collector of said transistor, means for coupling the other polarity of the input signal to the other terminal of said diode, a capacitor connected between the other terminal of said diode and the emitter of said transistor, a power supply having a first terminal coupled to the collector of said transistor and a second terminal coupled to the emitter of said transistor, and a resistor connected between the other terminal of said Zener diode and the second terminal of said power supply.

2. The circuit of claim 1 further comprising a positive feedback loop connected between the collector and base of said transistor.

3. The circuit of claim 2 wherein said positive feedback loop includes second and third transistors, said second transistor being of the opposite type as said first transistor, said third transistor being of the same type as said first transistor, means coupled to said power supply and to said second and third transistors for normally maintaining them nonconducting, the base of said second transistor being connected to the collector of said first transistor, the base of said third transistor being connected to the collector of said second transistor and to the base of said first transistor by a series connected resistance capacitance circuit, and a resistor connected between the emitter of said third transistor and the base of said first transistor.

4. The circuit of claim 2 further including an amplifier connected to said feedback loop, and a load connected to the output of said amplifier.

5. The circuit of claim 1 further including a Zener diode connected between the emitter of said transistor and the second terminal of said power supply, and a diode connected between said capacitor and the emitter of said transistor.

6. An impulse producing circuit responsive to signals exceeding a predetermined rate of change comprising a transistor, a Zener diode coupled between the collector and base of said transistor, biasing means coupled to said Zener diode and to said transistor for normally maintaining current through said diode, and means coupled between the base and emitter of said transistor for terminating substantial current flow through said Zener diode when a signal applied to the base of said transistor exceeds a predetermined rate of change thereby substantially increasing the current flow through said transistor.

7. An impulse producing circuit responsive to signals exceeding a predetermined rate of change comprising a transistor, means for coupling one polarity of an input signal to the base of said transistor, a Zener diode having one terminal connected to the collector of said transistor, means for coupling the other polarity of the input signal to the other terminal of said diode, and a capacitor connected between the other terminal of said diode and the emitter of said transistor.

8. The circuit of claim 7 further including a positive feedback circuit connected between the base and collector of said transistor.

9. An impulse producing circuit responsive to signals exceeding a predetermined rate of change comprising a first N-P-N transistor, a power supply having positive and negative terminals, a load resistor connected between the collector of said transistor and the positive terminal of said supply, a detector coil having one terminal connected to the base of said transistor, a first Zener diode having a cathode connected to the collector of said transistor and an anode connected to the other terminal of said coil, a first resistor connected between the anode of said first Zener diode and the negative terminal of said supply, a second Zener diode having a cathode connected to the emitter of said transistor and an anode connected to the negative terminal of said supply, a semiconductor diode having an anode connected to the emitter of said transistor, a capacitor connected between the cathode of said semiconductor diode and the anode of said first Zener diode, and a second resistor connected between the cathode of said semiconductor diode and the negative terminal of said supply.

10. The circuit of claim 9 further comprising a positive feedback loop connected between the collector and base of said transistor; said feedback loop including a P-N-P transistor having a base connected to the collector of said first N-P-N transistor, an emitter of said P-N-P transistor connected to the positive terminal of said power supply by way of a third Zener diode, and a collector connected to the base of said first N-P-N transistor by way of a series connected resistance, capacitance network; a second N-P-N transistor having a base connected to the collector of said P-N-P transistor, a collector connected to the positive terminal of said power supply by way of a resistor, and an emitter connected to the emitter of said first N-P-N transistor by way of a resistor; and a fourth Zener diode connected between the emitter of said first N-P-N transistor and the emitter of said P-N-P transistor.

11. The circuit of claim 10 further including an amplifier comprising a second P-N-P transistor having a base connected to the collector of said second N-P-N transistor, an emitter connected to the positive terminal of said power supply and a collector; and a load connected between the collector of said second P-N-P transistor and the negative terminal of said power supply.

References Cited in the file of this patent

UNITED STATES PATENTS

| | | |
|---|---|---|
| 2,915,600 | Starke | Dec. 1, 1959 |
| 2,979,667 | Paschal | Apr. 11, 1961 |